(12) United States Patent
Yang et al.

(10) Patent No.: US 6,622,746 B2
(45) Date of Patent: Sep. 23, 2003

(54) MICROFLUIDIC SYSTEM FOR CONTROLLED FLUID MIXING AND DELIVERY

(75) Inventors: Zhihao Yang, Webster, NY (US); Gilbert A. Hawkins, Mendon, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/021,457

(22) Filed: Dec. 12, 2001

(65) Prior Publication Data

US 2003/0106596 A1 Jun. 12, 2003

(51) Int. Cl.[7] .................................................. F15C 1/04
(52) U.S. Cl. ........................ 137/4; 137/341; 137/467.5; 137/807; 137/828
(58) Field of Search ................................ 137/828, 807, 137/4, 467.5, 341; 251/11

(56) References Cited

U.S. PATENT DOCUMENTS

| | | | |
|---|---|---|---|
| 3,513,706 A | * 5/1970 | Berrey | |
| 3,721,255 A | * 3/1973 | Suzuki et al. | 137/807 |
| 4,237,224 A | 12/1980 | Cohen et al. | 435/68 |
| 5,171,132 A | 12/1992 | Miyazaki et al. | 417/413 |
| 5,252,743 A | 10/1993 | Barrett et al. | 548/303.7 |
| 5,272,724 A | 12/1993 | Solomon et al. | 375/38 |
| 5,445,008 A | 8/1995 | Wachter et al. | 73/24.06 |
| 5,512,131 A | 4/1996 | Kumar et al. | 156/655.1 |
| 5,876,675 A | 3/1999 | Kennedy | 422/99 |
| 6,048,498 A | 4/2000 | Kennedy | 422/99 |
| 6,055,002 A | 4/2000 | Wen et al. | 346/140.1 |
| 6,068,751 A | 5/2000 | Neukermans | 204/601 |
| 6,192,939 B1 | 2/2001 | Yao et al. | 73/863.21 |
| 6,240,790 B1 | 6/2001 | Swedberg et al. | 204/653 |
| 6,284,113 B1 | 9/2001 | Bjornson et al. | 204/453 |
| 6,382,254 B1 | * 5/2002 | Yang et al. | 137/807 |

FOREIGN PATENT DOCUMENTS

| | | |
|---|---|---|
| EP | 0 568 902 A2 | 11/1993 |
| GB | 2 248 891 A | 4/1992 |
| WO | WO 01/01025 | 1/2001 |
| WO | WO 01/12327 A1 | 2/2001 |
| WO | WO 01/70400 | 9/2001 |

OTHER PUBLICATIONS

Koichi Tashiro et al., "Micro Flow Switches Using Thermal Gelation Of Methyl Cellulose For Biomolecules Handling", The 11th Internation Conference on Solid–State Sensors and Actuators, Munich, Germany, Jun. 10–14, 2001, pp. 932–935.

* cited by examiner

Primary Examiner—A. Michael Chambers
(74) Attorney, Agent, or Firm—Milton S. Sales

(57) ABSTRACT

A microfluidic system is provided for controlling delivery and mixing of thermally-responsive fluids. A plurality of microfluidic inlet channels open into a mixing chamber. A valve is associated with each of the inlet channels for controlling the flow of the thermally-responsive fluids through the inlet channels. The valves include a heater in thermal contact with at least a portion of the associated inlet channel, whereby the viscosity of the thermally-responsive fluids can selectively be controlled by heat to cause a change in flow of the thermally-responsive fluids through the inlet channels. A plurality of microfluidic outlet channels may be provided for transporting mixed fluids from the mixing chamber. A valve associated with each of the outlet channels controls the flow of the mixed thermally-responsive fluids through the outlet channels. These valves also include a heater in contact with at least a portion of the associated outlet channel, whereby said mixed thermally-responsive fluids can be directed from the mixing chamber selectively through each outlet channel.

13 Claims, 2 Drawing Sheets

MICROFLUIDIC SYSTEM FOR CONTROLLED FLUID MIXING AND DELIVERY

CROSS REFERENCE TO RELATED APPLICATIONS

Reference is made to commonly assigned co-pending U.S. patent application Ser. No. 09/735,322 filed in the names of Yang et al. on Dec. 12, 2000.

FIELD OF THE INVENTION

This invention relates to a microfluidic systems and method for mixing, regulating, delivering, transporting, and storing minute quantities of liquids.

BACKGROUND OF THE INVENTION

Microfluidic systems are very important in several applications. For example, U.S. Pat. No. 5,445,008 discloses these systems in biomedical research such as DNA or peptide sequencing. U.S. Pat. No. 4,237,224 discloses such systems used in clinical diagnostics such as blood or plasma analysis. U.S. Pat. No. 5,252,743 discloses such systems used in combinatorial chemical synthesis for drug discovery. U.S. Pat. No. 6,055,002 also discloses such systems for use in ink jet printing technology.

The so-called "Lab-on-a-Chip" generally refers to a microfabricated device of microfluidic systems that regulate, transport, mix and store minute quantities of liquids rapidly and reliably to carry out desired physical, chemical, and biochemical reactions in larger numbers. Those devices have been disclosed in U.S. Pat. No. 5,876,675, No. 6,048,498, and No. 6,240,790 and European WO 01/70400. One of the most important issues in the lab-on-a-chip devices is the moving and mixing of multiple transport fluids inside the chip in a controlled fashion. Several methods of transferring and controlling of liquids have been disclosed by U.S. Pat. No. 6,192,939 and No. 6,284,113 and by European WO 01/01025 and WO 01/12327. However, those methods involve in either electrokinetic transport mechanisms or controlling applied pressure or vacuum. Therefore, there are difficulties either in device fabrication or in accurate control of complex fluidic systems.

SUMMARY OF THE INVENTION

The present invention provides an integrated microfluidic system and the method to use it to control the delivery and mixing of transport fluids in a lab-on-a-chip device. This method takes advantages of a thermally-responsive fluid as the transport fluid, and uses integrated heating elements on the chip to control the flow rate come in and out of a fluid mixing or reaction element. The system is simple to fabricated and easy to use.

It is an object of this invention to provide a microfluidic system for controlling the delivery and mixing of materials through the microfluidic system and a method for controlling the delivery and mixing of materials through the microfluidic system without any mechanical actuation or moving parts.

It is another object of this invention to provide a microfluidic system using multiple integrated heaters in combined with a specially formulated thermally-responsive solution to control fluids from multiple in-let channels passing through a micro-fluidic mixing or reaction element to multiple out-let channels avoiding any mechanical actuation.

It is yet another object of this invention to provide a microfluidic delivery and mixing system that can be readily fabricated using standard CMOS fabrication technology in the semiconductor industry.

According to a feature of the present invention, a microfluidic system is provided for controlling delivery and mixing of thermally-responsive fluids. A plurality of microfluidic inlet channels open into a mixing chamber. A valve is associated with each of the inlet channels for controlling the flow of the thermally-responsive fluids through the inlet channels. The valves include a heater in thermal contact with at least a portion of the associated inlet channel, whereby the viscosity of the thermally-responsive fluids can selectively be controlled by heat to cause a change in flow of the thermally-responsive fluids through the inlet channels. A plurality of microfluidic outlet channels may be provided for transporting mixed fluids from the mixing chamber. A valve associated with each of the outlet channels controls the flow of the mixed thermally-responsive fluids through the outlet channels. These valves also include a heater in contact with at least a portion of the associated outlet channel, whereby said mixed thermally-responsive fluids can be directed from the mixing chamber selectively through each outlet channel.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Figure 1:
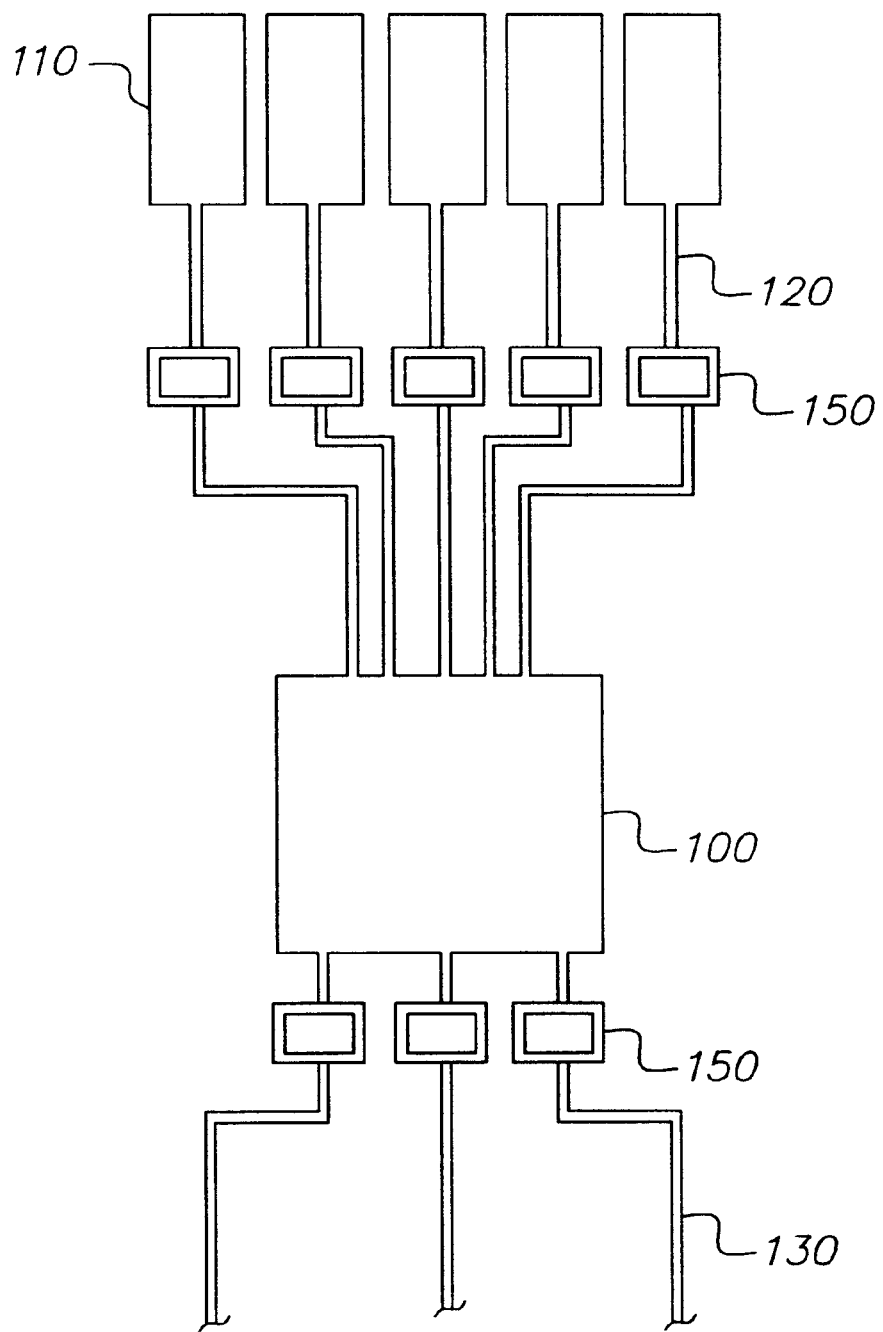
FIG. 1 is a schematic plan view of an integrated microfluidic system according to the present invention.

The term, "microfluidic", "microscale" or "microfabricated" generally refers to structural elements or features of a device, such as fluid channels, chambers or conduits, having at least one fabricated dimension in the range from about 0.1 $\mu$m to about 500 $\mu$m. In devices according to the resent invention, the microscale channels or chambers preferably have at least one internal cross-section dimension, e.g., depth, width, length, diameter, etc., between about 0.1 $\mu$m to about 500 $\mu$m, preferably between about 1 $\mu$m to about 200 $\mu$m.

The microfluidic devices described in present invention are preferably fabricated with the techniques commonly associated with the semiconductor electronics industry, e.g., photolithography, dry plasma etching, wet chemical etching, etc., on the surface of a suitable substrate material, such as silicon, glass, quartz, ceramics, as well as polymeric substrates, e.g., plastics. In a preferred embodiment of the invention, microfluidic devices typically comprise two or more layers of fabricated components that are appropriately mated or joined together.

Various techniques using chip technology for the fabrication of microfluidic devices, and particularly microcapillary devices, with silicon and glass substrates have been discussed by Manz, et al. (Trends in Anal. Chem. 1990, 10, 144, and Adv. In Chromatog. 1993, 33, 1). Other techniques such as laser ablation, air abrasion, injection molding, embossing, etc., are also known to be used to fabricate microfluidic devices, assuming compatibility with the selected substrate materials.

The function of a microfluidic valve is to control the flow rate or volume flux of a liquid through a micro-capillary channel. In general, for a fluid with a viscosity of $\mu$ which is driven through a micro-capillary channel with a length of L by a pressure of P, the volume flux, Q, of the liquid pass through the channel is:

$$Q = \frac{P}{\mu L} \cdot f,$$

where $f$ is the dimension factor of the cross-section for the microfluidic channel. For a circular cross-section capillary channel with a radius r:

$$f_c = \frac{\pi r^4}{8},$$

while for a rectangular cross-section channel with a width a, height b and aspect ratio $\eta=b/a(\eta \geq 1)$, $$f_R = a^4 \left[ \frac{\eta}{12} - \frac{16}{\pi^5} \tanh\left(\frac{\pi}{2}\eta\right) \right].$$

It is generally true that the flow rate or the volume flex is inversely proportional to the internal viscosity of fluid in the channel. Therefore, if one can control the viscosity of the fluid in the channel, one can indeed control the flow rate of the fluid passing though the channel.

In a preferred embodiment of the invention, a microfluidic delivery and mixing system has at least two microfluidic valves which are designed utilizing the property of a specially formulated thermally-responsive fluid serving as the carrier fluid for transport of subject materials through the microfluidic channels for various of purpose.

The "subject materials" simply refers to the materials, such as chemical or biological compounds, of interest, which may also include a variety of different compounds, including chemical compounds, mixtures of chemical compounds, e.g., a dye, a pigment, a protein, DNA, a peptide, an antibody, an antigen, a cell, an organic compound, a surfactant, an emulsion, a dispersion, a polysaccharide, colloidal particles, organic or inorganic compounds, nucleic acids, or extracts made from biological materials, such as bacteria, plains, fungi, or animal cells or tissues, naturally occurring or synthetic compositions. The viscosity of the formulated thermally-responsive fluid is sensitive to the temperature, and preferably increases with the increase of temperature.

In another preferred embodiment of the invention, the thermally-responsive material comprises at least one kind of block copolymer with at least one block comprising poly (ethylene oxide), commonly referred to as PEO. In another preferred embodiment of the invention, the thermally-responsive material comprises a tri-block copolymer of poly(ethylene oxide)-poly(propylene oxide)-poly(ethylene oxide), commonly referred to as PEO-PPO-PEO dissolved in an aqueous solution. The preferred concentrations of the solutions are from about 5% to about 80%, preferably from 10% to 40% in weight.

The solutions at room temperature, e.g., 22° C., are fluidic with a typical viscosity less than 10 centipoise. The viscosity of the formulated solutions increases dramatically when raising the temperature from about 30° C. to about 80° C., as the solutions rapidly form non-fluidic gels at the elevated temperature. The viscosity change of the formulated solutions in response of temperature change is entirely reversible as the solutions turn to fluidic having the original viscosity when cooled down to its initial temperature.

In another preferred embodiment, a methyl cellulose polymer may be used as a thermally-responsive material in the carrier fluid. For example, 2.75 wt. % solution of METHOCEL® K100LV (Dow Chemical Co.) having a viscosity of about 1 poise at 50° C. and a viscosity of more than 10 poise at 75° C. can be used.

FIG. 1 illustrates an example of the microfluidic mixing and delivery system according to a preferred embodiment of the present invention. It comprises a fluid mixing element or chamber 100 having the dimensions of between about 0.1 $\mu$m to about 500 $\mu$m, preferably between about 1 $\mu$m to about 200 $\mu$m, a plurality of in-let microfluidic channels 120 connected to input fluid reservoirs 110, and at least one out-let microfluidic channel 130. Each in-let or out-let microfluidic channel has at least one heater element to control the flow rate of the fluid passing through the channel. A positive external pressure from in-let to out-let is maintained to drive the fluid through the system. The microfluidic mixing and delivery device of the invention may be made from silicon, glass, quartz, ceramics, as well as polymeric substrates, e.g., plastics, such as polyamide, polymetbylmethacrylate (PMMA), polycarbonate, polytetrafluoroethylene, Teflon®, polydimethylsiloxane (PDMS), polyvinylchloride (PVC), polysulfone, etc. The microfluidic mixing and delivery device of the invention are preferably fabricated with the techniques commonly associated with the semiconductor electronics industry, e.g., photolithography, dry plasma etching, wet chemical etching, etc. It also may be fabricated by molding from microfabricated masters, such as injection mold, embossing, microcontact imprinting or polymerizing the precursor material within the mold (see U.S. Pat. No. 5,512,131). In addition, it is known in the art that microfluidic channels may be fabricated using photoresist material such as SU-8® (MicroChem Corp.).

Figure 2:
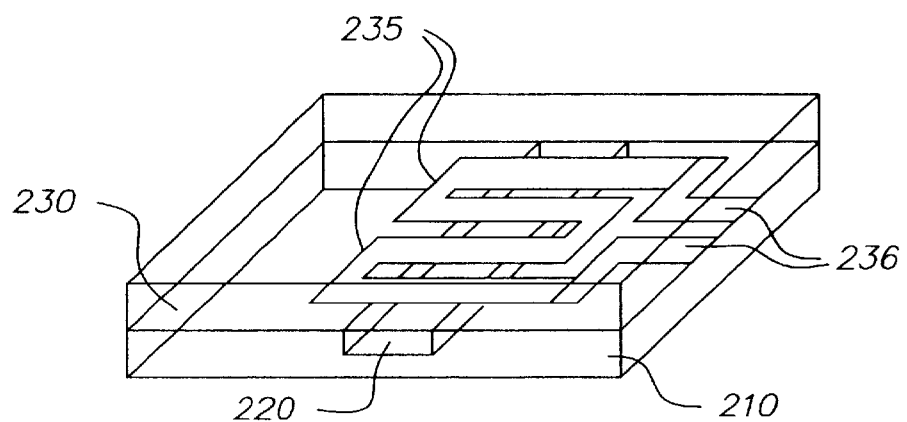
FIG. 2 is a schematic perspective view in section showing a microfluidic valve usable in the system of FIG. 1.

FIG. 2 illustrates an example of the microfluidic valve according to a preferred-embodiment of the present invention. This device comprises an upper layer 230 and a lower layer 210. A microfluidic channel 220 is fabricated on the upper surface of the lower layer substrate material, which may be silicon, glass, quartz, ceramics, as well as polymeric substrates, e.g., plastics, such as polyamide, polymethylmethacrylate (PMMA), polycarbonate, polytetrafluoroethylene, Teflon®, polydimethylsiloxane (PDMS), polyvinylchloride (PVC), polysulfone, etc. Such polymeric substrates can be fabricated either by the microfabrication techniques described above, or by molding from microfabricated masters, such as injection mold, embossing or polymerizing the precursor material within the mold (see U.S. Pat. No. 5,512,131). In addition, it is known in the art that microfluidic channels may be fabricated using photoresist material such as SU-8® (MicroChem Corp.).

A heater 235, preferably made from appropriately doped polysilicon, is fabricated on the lower surface of the upper layer substrate, which may also be silicon, glass, quartz, ceramics, or polymeric materials. A conducting material 236, such as aluminum or copper, is also integrated to serve as wires to connect the heater to an external power supply. In a preferred embodiment of the invention, the microfluidic devices are fabricated using CMOS compatible fabrication techniques, and the heaters are integrated with a CMOS circuit on the chip, which controls the signals or voltages applied to the heaters to activate the valve.

Figure 3:
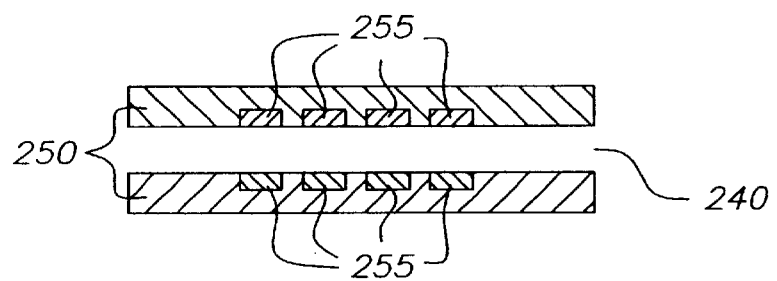
FIG. 3 is a side sectional view of another embodiment of a microfluidic valve usable in the system of FIG. 1.

In another embodiment of the invention shown in FIG. 3, heaters 255 may be located on both upper and lower substrates 250 of the microfluidic channel 240. This will increase the heat transport efficiency and increase the thermal activation speed of the valve. In still another embodiment of the invention, increased thermal activation speed may be achieved using a "fin" heater which consists of a group of parallel heater elements in the microfluidic channel.

The following example illustrates the utility of the present invention.

EXAMPLE

Viscosity vs. Temperature of Thermally-responsive Solutions

Thermally-responsive solutions were formulated by dissolving a tri-block copolymer of poly(ethylene oxide)-poly(propylene oxide)-poly(ethylene oxide), or PEO-PPO-PEO in an aqueous solution. A series of the PEO-PPO-PEO tri-block copolymers were obtained from BASF under the product trade name of Pluronic®.

A Rheometrics ARES Fluids Spectrometer, from Rheometric Scientific, Inc., equipped with a corvette geometry, was used to measure the oscillatory shear properties of the Pluronic® solutions. Dynamic viscosity was measured continuously as the temperature was ramped from 20° C. to 80° C. The typical ramp rate was 1° C./minute. The fluids were initially characterized at 20° C. in a continuous shear experiment covering a typical range of shear rates from 1 to 100/second. All were found to have low viscosity and Newtonian response. For the temperature scan experiments, a monitoring frequency of 10 radians/second was used.

The results are shown in the following tables:

TABLE 1

| Temperature (° C.) | Viscosity (Poise) of Pluronic ® P85 Solutions | | |
|---|---|---|---|
| | 20% | 15% | 10% |
| 25 | 0.09 | 0.037 | 0.022 |
| 30 | 0.112 | 0.033 | 0.017 |
| 35 | 0.113 | 0.031 | 0.014 |
| 40 | 0.096 | 0.026 | 0.012 |
| 45 | 0.079 | 0.022 | 0.01 |
| 50 | 0.066 | 0.019 | 0.008 |
| 55 | 0.054 | 0.016 | 0.007 |
| 60 | 0.05 | 0.014 | 0.006 |
| 62 | 0.069 | 0.016 | 0.007 |
| 64 | 0.143 | 0.029 | 0.011 |
| 66 | 0.382 | 0.065 | 0.022 |
| 68 | 1.283 | 0.185 | 0.059 |
| 70 | 5.176 | 0.792 | 0.194 |
| 72 | 15.018 | 3.684 | 0.821 |
| 74 | 31.802 | 11.303 | 3.534 |
| 76 | 46.005 | 21.505 | 9.134 |
| 78 | 52.008 | 28.574 | 13.39 |
| 80 | 51.921 | 30.369 | 17.917 |

TABLE 2

Viscosity of 25% Pluronic ® L62 Solution

| Temperature (° C.) | Viscosity (Poise) |
|---|---|
| 22 | 0.072 |
| 25 | 0.068 |
| 28 | 0.069 |
| 30 | 0.073 |
| 32 | 0.081 |
| 34 | 0.1 |
| 36 | 0.136 |
| 38 | 0.237 |
| 40 | 0.44 |

TABLE 2-continued

Viscosity of 25% Pluronic ® L62 Solution

| Temperature (° C.) | Viscosity (Poise) |
|---|---|
| 42 | 0.834 |
| 44 | 0.976 |
| 46 | 1.777 |
| 48 | 5.864 |
| 49 | 26.704 |
| 50 | 37.107 |
| 52 | 40.677 |
| 54 | 35.045 |
| 56 | 31.245 |

TABLE 3

Viscosity of 22% Pluronic ® F87 Solution

| Temperature (° C.) | Viscosity (Poise) |
|---|---|
| 22 | 0.201 |
| 25 | 0.242 |
| 30 | 0.525 |
| 32 | 0.696 |
| 34 | 0.968 |
| 36 | 1.225 |
| 37 | 1.505 |
| 38 | 385 |
| 39 | 13873 |
| 40 | 17046 |
| 41 | 15056 |
| 42 | 14963 |
| 45 | 14512 |
| 50 | 15008 |
| 55 | 15509 |

The above results show that the Pluronic® P85 solutions with the concentrations from 10% to 20% have viscosity increases of more than 3 orders of magnitude when the temperature increases from 60° C. to 80° C., the 25% Pluronic® L62 solution has a 3 orders of magnitude viscosity increase with temperature from 30° C. to 50° C., and the 22% Pluronic® F87 solution has a more than 5 orders of magnitude viscosity increase with temperature from 30° C. to 40° C. The results demonstrated that these fluids are thermally-responsive and can be used in the device and method of the invention.

The invention has been described in detail with particular reference to certain embodiments thereof, but it will be understood that variations and modifications can be effected within the spirit and scope of the invention.

What is claimed is:

1. A method for controlling delivery and mixing of thermally-responsive liquids; said method comprising the steps of:

flowing respectively different thermally-responsive liquids along a plurality of microfluidic inlet channels opening into a mixing chamber; and selectively activating heaters which are in thermal contact with associated microfluidic inlet channels so as to control the flow of the thermally-responsive liquids through the microfluidic inlet channels.

2. A method as set forth in claim 1 further comprising selectively activating heaters which are in thermal contact with associated microfluidic outlet channels from the mixing chamber so as to control the flow of the thermally-responsive liquids from the mixing chamber along the microfluidic outlet channels.

3. A microfluidic system for controlling delivery and mixing of thermally-responsive fluids; said system comprising:

a mixing chamber;

a plurality of microfluidic inlet channels opening into the mixing chamber and adapted to transport respectively different fluids into the mixing chamber; and a valve associated with each of said microfluidic inlet channels and adapted to control the flow of the thermally-responsive fluids through the microfluidic inlet channels, said valves including a heater in thermal contact with at least a portion of the associated microfluidic inlet channel, whereby the viscosity of said thermally-responsive fluids can selectively be controlled by heat from said heater to cause a change in flow of said thermally-responsive fluids through said microfluidic inlet channels.

4. A microfluidic system as set forth in claim 3 wherein the thermally-responsive fluids are thickened by heat from said heater to cause a reduction in flow of said thermally-responsive fluids through said microfluidic inlet channels.

5. A microfluidic system as set forth in claim 3 wherein the fluids comprise a material and a thermally-responsive carrier fluid.

6. A microfluidic system as set forth in claim 3 wherein the fluid channels have an internal cross-sectional dimensional between about 0.1 $\mu$m and about 500 $\mu$m.

7. A microfluidic system as set forth in claim 3 wherein the fluid channels have an internal cross-sectional dimensional between about 1 $\mu$m and about 200 $\mu$m.

8. A microfluidic system as set forth in claim 3 wherein said thermally-responsive fluid is gelled by heat from said heater.

9. A microfluidic system as set forth in claim 3 wherein said heaters are contained in said microfluidic inlet channels.

10. A microfluidic system as set forth in claim 3 wherein said channels are enclosed by silicon, glass, polyimide, quartz, ceramic, polymethylmethacrylate, polydimethylsiloxane or photoresist material.

11. A microfluidic system as set forth in claim 3 wherein said channels are partially enclosed.

12. A microfluidic system as set forth in claim 3 wherein said channels are grooves.

13. A microfluidic system as set forth in claim 3 further comprising:

a plurality of microfluidic outlet channels communicating with the mixing chamber and adapted to transport mixed fluids from the mixing chamber; and a valve associated with each of said microfluidic outlet channels for controlling the flow of the mixed thermally-responsive fluids through the microfluidic outlet channels, said valves including a heater in contact with at least a portion of the associated microfluidic outlet channel, whereby said mixed thermally-responsive fluids can be directed from the mixing chamber selectively through each outlet channel.

\* \* \* \* \*